(12) United States Patent
Huan (10) Patent No.: US 11,829,768 B2
(45) Date of Patent: Nov. 28, 2023

(54) METHOD FOR SCHEDULING OUT-OF-ORDER QUEUE AND ELECTRONIC DEVICE ITEMS

(71) Applicant: BEIJING VCORE TECHNOLOGY CO., LTD., Beijing (CN)

(72) Inventor: Dandan Huan, Beijing (CN)

(73) Assignee: BEIJING VCORE TECHNOLOGY CO., LTD., Beijing (CN)

( * ) Notice: Subject to any disclaimer, the term of this patent is extended or adjusted under 35 U.S.C. 154(b) by 205 days.

(21) Appl. No.: 17/530,192

(22) Filed: Nov. 18, 2021

(65) Prior Publication Data
US 2022/0147361 A1 May 12, 2022

Related U.S. Application Data

(63) Continuation of application No. PCT/CN2021/095138, filed on May 21, 2021.

(30) Foreign Application Priority Data

Nov. 10, 2020 (CN) .......................... 202011243930.1

(51) Int. Cl.
G06F 9/38 (2018.01)
(52) U.S. Cl.
CPC .......... G06F 9/3856 (2023.08); G06F 9/3806 (2013.01); G06F 9/3861 (2013.01)
(58) Field of Classification Search
CPC ..... G06F 9/3856; G06F 9/3806; G06F 9/3861
See application file for complete search history.

(56) References Cited

U.S. PATENT DOCUMENTS

| 5,584,038 A | 12/1996 | Papworth et al. |
| 7,882,335 B2 | 2/2011 | Luick |
| 9,304,777 B1 * | 4/2016 | Schuttenberg ........ G06F 9/3836 |
| (Continued) | | |

FOREIGN PATENT DOCUMENTS

| CN | 1940862 | 4/2007 |
| CN | 104823168 | 8/2015 |
| (Continued) | | |

OTHER PUBLICATIONS

WIPO, International Search Report and Written Opinion for PCT/CN2021/095138, dated Aug. 2, 2021.
(Continued)

*Primary Examiner* — Zachary K Huson
(74) *Attorney, Agent, or Firm* — Hodgson Russ LLP (57) ABSTRACT

The disclosure provides a method for scheduling an out-of-order queue The method includes: adding a highest bit before each address in a reorder buffer (ROB) or in a branch reorder buffer (B-ROB), in which the addresses are entered by instructions in the out-of-order queue; adding a highest bit for a read pointer (roqhead) of the ROB or B-ROB; performing an exclusive-OR (XOR) operation on the highest bit for the roqhead and the highest bit for each of the addresses entered by two instructions to be compared, and determining addresses after the XOR operation as age information of the two instructions; and comparing the age information to determine the oldest instruction in the queue for execution in response to scheduling the out-of-order queue.

20 Claims, 9 Drawing Sheets adding a highest bit before each address in a reorder buffer (ROB) or in a branch reorder buffer (B-ROB) ⟶ S101 performing an exclusive-OR (XOR) operation on the added highest bit for a read pointer (roqhead) of the ROB or B-ROB and the added highest bit for each of two addresses to be compared in the ROB or B-ROB, and determining addresses after the XOR operation as age information of the two instructions, so as to obtain the new and old of instruction age by comparing the age information ⟶ S102

(56) References Cited

U.S. PATENT DOCUMENTS

| | | | | |
|---|---|---|---|---|
| 2012/0204005 A1* | 8/2012 | Dockser | ................ | G06F 9/3877 |
| | | | | 712/205 |
| 2013/0173886 A1* | 7/2013 | Dockser | ................ | G06F 9/3838 |
| | | | | 712/216 |
| 2016/0335088 A1 | 11/2016 | Scalabrino et al. | | |
| 2018/0189115 A1 | 7/2018 | Abdallah | | |
| 2021/0042120 A1* | 2/2021 | Zheng | ................... | G06F 9/3455 |

FOREIGN PATENT DOCUMENTS

| | | |
|---|---|---|
| CN | 107729135 | 2/2018 |
| CN | 108628759 | 10/2018 |
| CN | 111198715 | 5/2020 |
| CN | 111538534 | 8/2020 |
| CN | 112099854 | 12/2020 |

OTHER PUBLICATIONS

CNIPA, First Office Action for CN Application No. 202011243930.1, dated Dec. 28, 2020.
CNIPA, Second Office Action for CN Application No. 202011243930.1, dated Jan. 15, 2021.
EPO, Extended European Search Report for EP Application No. 21810884.3, dated Jun. 28, 2023.

* cited by examiner

METHOD FOR SCHEDULING OUT-OF-ORDER QUEUE AND ELECTRONIC DEVICE ITEMS

CROSS-REFERENCE TO RELATED APPLICATIONS

This application is a continuation application of International Application No. PCT/CN2021/095138, filed on May 21, 2021, which claims priority to Chinese Patent Application No. 202011243930.1, filed on Nov. 10, 2020, the entire contents of which are incorporated herein by reference.

TECHNICAL FIELD

The embodiments of the disclosure relate to the field of out-of-order processor technology, in particular to a method for scheduling an out-of-order queue and an electronic device.

BACKGROUND

When the instructions in the out-of-order processor enter the out-of-order queue, the instructions in the processor may not flow in a sequence specified by the program. As long as execution conditions are met, the following instructions can be first executed with respect to previous instructions, in order to improve the instruction execution speed.

When the out-of-order queue of the out-of-order processor is scheduled and multiple instructions in the out-of-order queue are ready, the earliest instruction in the program is generally selected for execution. That is, the oldest-first strategy is used for scheduling arbitration, so that the sequence of the instructions can be determined. It is considered that the older the instruction is, the more instructions are related to it. Therefore, the oldest instruction is first executed, which can effectively improve the degree of parallelism that instructions are executed by the processor. Furthermore, the hardware resource of the processor is occupied by the oldest instruction, including other components such as other out-of-order execution queues, reorder buffers, and store buffers. The earlier these old instructions are executed, the sooner these hardware resources can be released for use of the following instructions. The out-of-order execution queue in the out-of-order processor includes issue queues, accessing queues for all levels of caches, miss-status handling registers (MSHR), consistency request queues, etc.

When cancellation occurs in the out-of-order processor due to branch mis-prediction, speculative memory accesses fail or exceptions, etc., it is necessary to determine which instructions are located behind instructions for the branch mis-prediction, instructions for the re-execution caused by memory access dependence, instructions for the exceptions and belong to instructions that need to be cancelled together with these instructions leading to the cancellation, among the instructions that have not yet been submitted in the pipeline. Such instructions are cancelled at each stage of the pipeline, so that they are re-executed or rolled back to a specific stage of the pipeline for starting execution.

To identify which instructions in the out-of-order queue are old, it is necessary to know age information of these instructions. The age information indicates the sequence in which the instructions enter the pipeline. In an in-order execution processor, it is easy to track the age information of instructions. After the instructions enter the out-of-order queue in the out-of-order processor, the age information is disrupted. However, there is another place in the processor that records the sequence of all instructions in the processor entering the pipeline, i.e., a reorder buffer (ROB). After the instructions are renamed, the instructions may be written to the ROB in the sequence specified in the program, so a position of each instruction in the ROB (that is, addressing an address value in the ROB) can be used as the age information of this instruction.

For the cancellation in the processor, when it is determined which instructions are located behind the instructions leading to the cancellation and belong to the instructions that that need to be cancelled together with the instructions leading to the cancellation among the instructions that have not yet been submitted in the pipeline, position information in the ROB may be used to compare which instructions are located behind the instructions leading to the cancellation.

In addition, for the cancellation due to branch mis-prediction, when it is determined which instructions are located behind branch instructions for the branch mis-prediction and need to be cancelled together with the instructions for the branch mis-prediction among the instructions that have not yet been submitted in the pipeline, position information in a branch reorder buffer (B-ROB) may also be used to compare which instructions are located behind the instructions for the branch mis-prediction and need to be cancelled, in addition to the position information recorded in the ROB.

SUMMARY

According to a first aspect of the disclosure, a method for scheduling an out-of-order queue includes: adding a highest bit before each address in a reorder buffer (ROB) or in a branch reorder buffer (B-ROB), in which the addresses are entered by instructions in the out-of-order queue; adding a highest bit for a read pointer (roqhead) of the ROB or B-ROB; performing an exclusive-OR (XOR) operation on the highest bit for the roqhead and the highest bit for each of the addresses entered by two instructions to be compared, and determining addresses after the XOR operation as age information of the two instructions; and comparing the age information to determine the oldest instruction in the queue for execution in response to scheduling the out-of-order queue.

According to a second aspect of the disclosure, an electronic device includes an out-of-order processor, and a reorder buffer (ROB) or a branch reorder buffer (B-ROB) configured to store addresses entered by instructions in an out-of-order queue. The out-of-order processor is configured to: add a highest bit before each address and a highest bit for a read pointer (roqhead) of the ROB or B-ROB; perform an exclusive-OR (XOR) operation on the highest bit for the roqhead and the highest bit for each of the addresses entered by two instructions to be compared; determine addresses after the XOR operation as age information of the two instructions; and compare the age information to determine the oldest instruction in the out-of-order queue for execution in response to scheduling the out-of-order queue.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure will become apparent and more readily appreciated from the following descriptions made with reference to the drawings, in which.

DETAILED DESCRIPTION

Embodiments of the disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the disclosure, and are not construed to limit embodiments of the disclosure.

Since the ROB or the B-ROB is essentially a First Input First Output (FIFO) queue, directly using addresses in the ROB or B-ROB often cannot express true age information of the instructions. Taking the ROB including 8 entries as an example, as illustrated in FIG. 1, directly using the ROB address for the instruction cannot express the true age information of the instruction.

Figure 1:
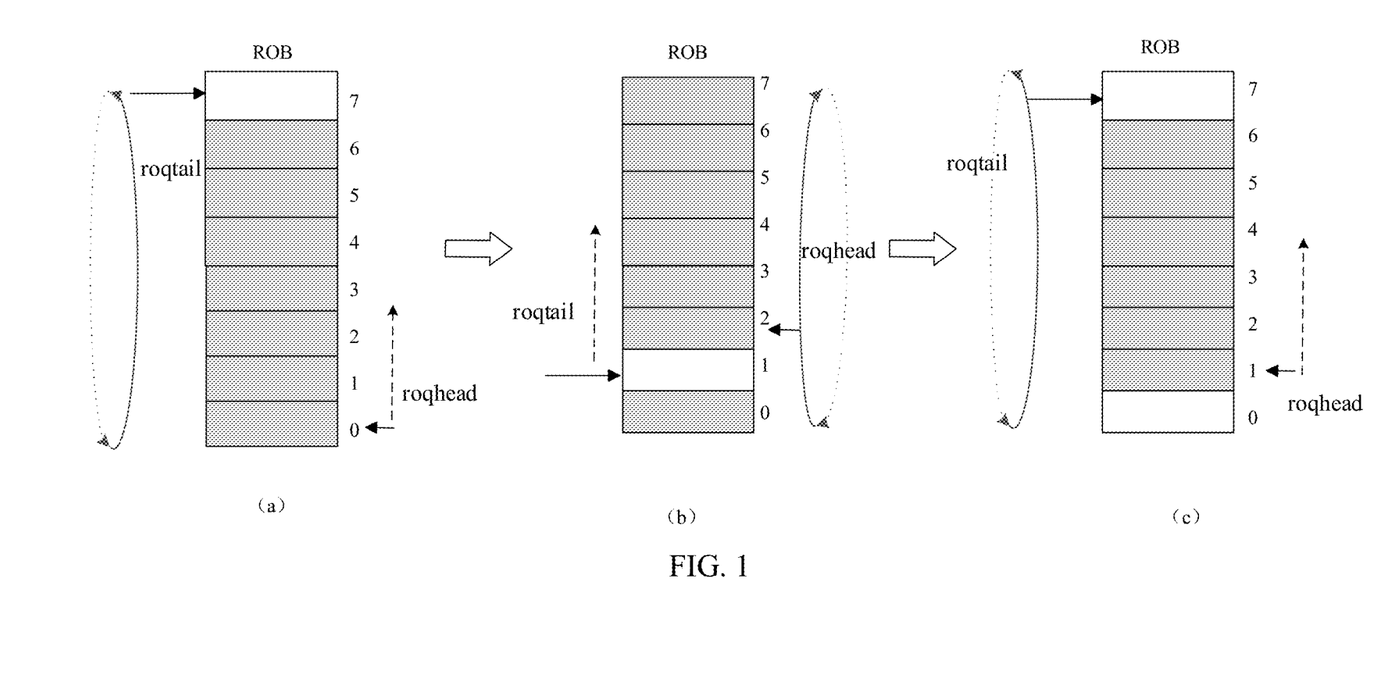
FIG. 1 is a schematic diagram illustrating a roqhead, a roqtail and address changes in the ROB.

As illustrated in FIG. 1, in an initial state, the address value at the bottom of the ROB is the smallest, i.e., 0, and the address value at the top of the ROB is the largest, i.e., 7. The instructions are written into the ROB from the address 0, so the instruction in the item with the small ROB address is old. Writing the ROB is controlled by a tail pointer (also called a write pointer), and reading the ROB is controlled by a head pointer (also called a read pointer). Therefore, a position of each instruction in the ROB is allocated by the write pointer. The value of the write pointer may be set to 0, 1, 2, 3, 4, 5, 6 and 7 repeatedly. Every time the write pointer flips (that is, from 7 to 0), there is a mess in the sequence of new and old write pointer values, which makes it impossible to determine the age of the instruction based on the ROB address value.

In detail, both the write pointer and read pointer of the ROB point to the address 0 in a reset state (i.e., the initial state). When a new instruction is written into the ROB, the write pointer value will be increased. FIG. 1(*a*) shows the case where seven instructions are written in the ROB. At this time, both the write pointer and read pointer are on the same "plane", i.e., neither has flipped. At this time, the instruction with the small ROB address value may be old.

As time goes on, another two instructions enter the ROB and two instructions in the ROB leave. At this time, the write pointer flips and points to 1, while the read pointer does not flip and points to 2. As illustrated in FIG. 1(*b*), the instruction with the small ROB address value is no longer old.

As time goes on again, six instructions are written in the ROB and seven instructions leave. As shown in FIG. 1(*c*), the write pointer now points to 7, the read pointer flips and points to 1. At this time, both the write pointer and read pointer are on the same "plane" again. At this time, it can be seen that the instruction with the small ROB address value is old. It can be seen that the age of the instruction cannot be determined directly based on the ROB address value. Therefore, it is necessary to design a mechanism to solve the above-mentioned problems.

The following describes the method and apparatus for scheduling an out-of-order queue and determining cancelled items in the queue according to embodiments of the disclosure with reference to the drawings. First, the method for scheduling an out-of-order queue and determining cancelled items in the queue according to the embodiments of the disclosure will be described with reference to the drawings.

Figure 2:
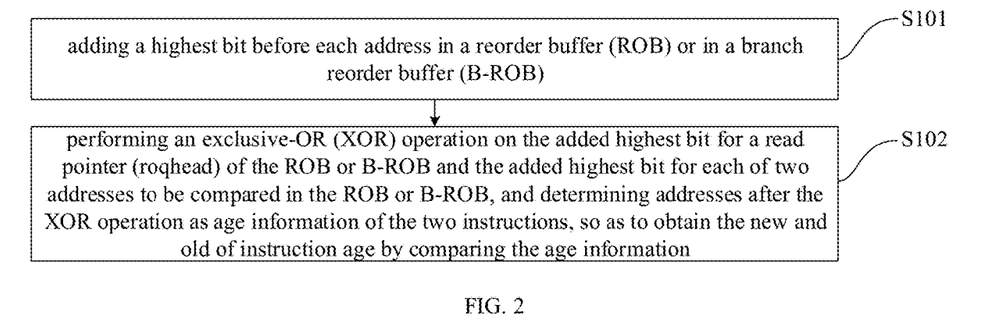
FIG. 2 is a flowchart illustrating a method for scheduling an out-of-order queue and determining cancelled items in the queue according to an embodiment of the disclosure.

In detail, FIG. 2 is a flowchart of a method for scheduling an out-of-order queue and determining cancelled items in the queue according to an embodiment of the disclosure.

As illustrated in FIG. 2, the method for scheduling an out-of-order queue and determining cancelled items in the queue includes the following steps.

At S101, a highest bit is added before each address in a reorder buffer (ROB) or a branch reorder buffer (B-ROB).

In an embodiment, the highest bit added before each address in the ROB or B-ROB has a value A or a value B, in which both the value A and the value B are 1-bit binary value, and the value A is opposite to the value B.

For example, the value A and the value B can be 0 or 1, that is, if A is 0, then B is 1; and if A is 1, then B is 0.

At S102, an exclusive-OR (XOR) operation is performed on the added highest bit for a read pointer (roqhead) of the ROB or B-ROB and the added highest bit for each of two addresses in the ROB or B-ROB to be compared, and addresses after the XOR operation are determined as age information of the two instructions, so as to obtain the new and old of instruction age by comparing the age information.

Figure 3:
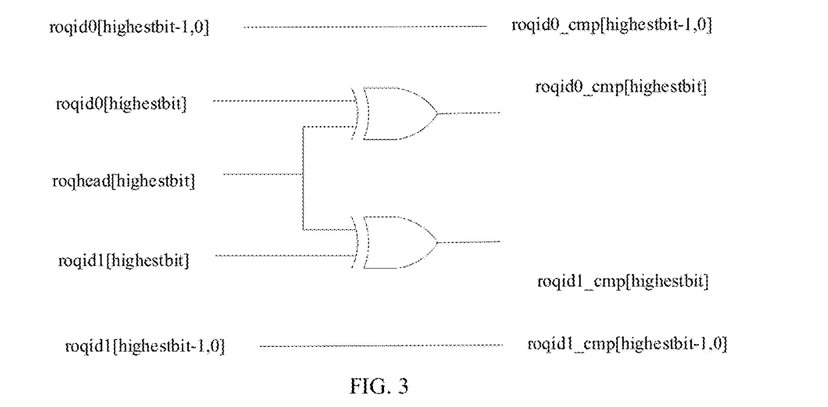
FIG. 3 is a structural schematic diagram illustrating an apparatus for instruction age comparison according to an embodiment of the disclosure.

It should be noted that, a comparison apparatus as shown in FIG. 3 may be configured to achieve comparing instruction ages in the embodiment of the disclosure, that is, by adding an exclusive-OR (XOR) gate. The use of XOR gates reduces the number of comparators, thereby effectively reducing the complexity of determining the instruction age, reducing the delay of determining the instruction age, effectively improving the performance of the out-of-order processor, reducing power consumption, and saving area.

As illustrated in FIG. 3, a highest bit is added before each address in the ROB or B-ROB, the XOR operation is performed on the added highest bit for the roqhead of the ROB or B-ROB and the added highest bit for each of the two addresses to be compared in the ROB or B-ROB, so as to determine each address after the XOR operation as the age information of each instruction. Then, two addresses after the XOR operation (represented by roqid0_cmp and roqid1_cmp, respectively) are served as age information of the two instructions, and the two pieces of age information are compared to determine which instruction is new, where roqid0_cmp and roqid1_cmp are respectively expressed by:

roqid0cmp={roqid0[highestbit]^roqhead[highestbit], roqid0[highestbit-1:0]};

roqid1_cmp={roqid1[highestbit]^roqhead[highestbit], roqid1[highestbit-1:0]}.

where roqid0[highestbit] and roqid1[highestbit] indicate the added highest bits for two addresses to be compared in the ROB or B-ROB respectively; roqhead[highestbit] indicates the added highest bit for the roqhead of the ROB or B-ROB; roqid0[highestbit-1:0] and roqid1[highestbit-1:0] indicate from 0 to [the highest bit-1] in each of the ROB/B-ROB addresses for two instructions to be compared; roqid0_cmp and roqid1_cmp indicate the addresses after the XOR operation. In FIG. 3, roqid0_cmp[highestbit] and roqid1_cmp[highestbit] indicate the addresses obtained after the XOR operation on the highest bit; the address of roqid0_cmp[highestbit-1:0] is the same as the address of roqid0[highestbit-1:0], and the address of roqid1_cmp[highestbit-1:0] is the same as the address of roqid1[highestbit-1:0].

Taking the ROB as an example, the ROB addresses (i.e., the ROB number) corresponding to the two instructions to be compared for instruction age comparison are marked as roqid0 and roqid1, the bit number of the added highest bit for each address in the ROB is marked as highestbit. During the initialization, the added highest bit for the address allocated by the roqtail is 0. When the roqtail flips, the added highest bit for the address re-allocated by the roqtail changes to 1. When the roqtail flips again, the added highest bit for the address re-allocated by the roqtail changes to 0. The highest bit added before each address of the instruction in the ROB is calculated through the XOR operation with the added highest bit for the roqhead of the ROB to obtain an address as age information of the instruction. Then, the obtained address is used for comparison. The addresses for comparison are marked as roqid0_cmp and roqid1_cmp, and each calculation formula is as follows:

roqid0_cmp={roqid0[highestbit]^roqhead[highestbit], roqid0[highestbit-1:0]};

roqid1_cmp={roqid1[highestbit]^roqhead[highestbit], roqid1[highestbit-1:0]}.

In an embodiment of the disclosure, reading the ROB or B-ROB is controlled by the read pointer (marked as roqhead). When the queue is not empty, the roqhead points to a first item to be read next time. The ROB or B-ROB is an ordered first-in first-out queue and the item to which the roqhead points is the oldest item in the ROB or B-ROB. The oldest item is the item corresponding to the oldest instruction. When the queue is empty, both the roqhead and the roqtail point to the same empty item, and a value of the added highest bit for the roqhead is the same as a value of the added highest bit for the roqtail. In this embodiment, the read pointer of the ROB or B-ROB is recorded as roqhead. The read pointer is also called the head pointer.

In an embodiment of the disclosure, writing the ROB or B-ROB is controlled by the write pointer and a position of each instruction in the ROB or B-ROB is allocated by the write pointer (marked as roqtail). When the queue is not full, the roqtail points to a first empty item to be written next time. When the queue is full, both the roqhead and roqtail point to the same item, and a value of the added highest bit for the roqhead is opposite to a value of the added highest bit for the roqtail. In this embodiment, the write pointer of the ROB is marked as roqtail. The queue items from the roqhead to a previous item of the roqtail in the ROB queue are valid items. The write pointer is also called a tail pointer.

In an embodiment of the disclosure, both the roqhead and the roqtail of the ROB or B-ROB point to a reset item in a reset state, and when a new instruction is written in the ROB or B-ROB, the roqtail points to the next item to be written, and when the instruction is exited, the roqhead points to the next item to be read.

The reset item refers to the same item pointed by the roqhead and roqtail in the reset state, the reset item is any item in the queue, and the added highest bit of the address for the roqhead is the same as the added highest bit of the address for the roqtail during the reset. The next item to be read pointed by the roqhead or the next item to be written pointed by the roqtail is directed in a direction in which the address increases or in a direction in which the address decreases.

It should be noted that, when the roqhead and roqtail point to the next item in the direction in which a value of the ROB address without the added highest bit increases. That is, according to the order from the small ROB address value to the large ROB address value before adding the highest bits, each of the instructions enters low bits of each ROB address allocated by the roqhead and roqtail. Therefore, the ROB address value is small, the age value of the instruction is small and the age of the instruction is old. The smaller the age value, the older the age, and the larger the age value, the newer the age.

When the roqhead and roqtail point to the next item in the direction in which a value of the ROB address without the added highest bit decreases. That is, according to the order from the large ROB address value to the small ROB address value before adding the highest bits, each of the instructions enters low bits of each ROB address allocated by the roqhead and roqtail. Therefore, the ROB address value is large, the age value of the instruction is large and the age of the instruction is old. The larger the age value, the older the age, and the smaller the age value, the newer the age.

Figure 4:
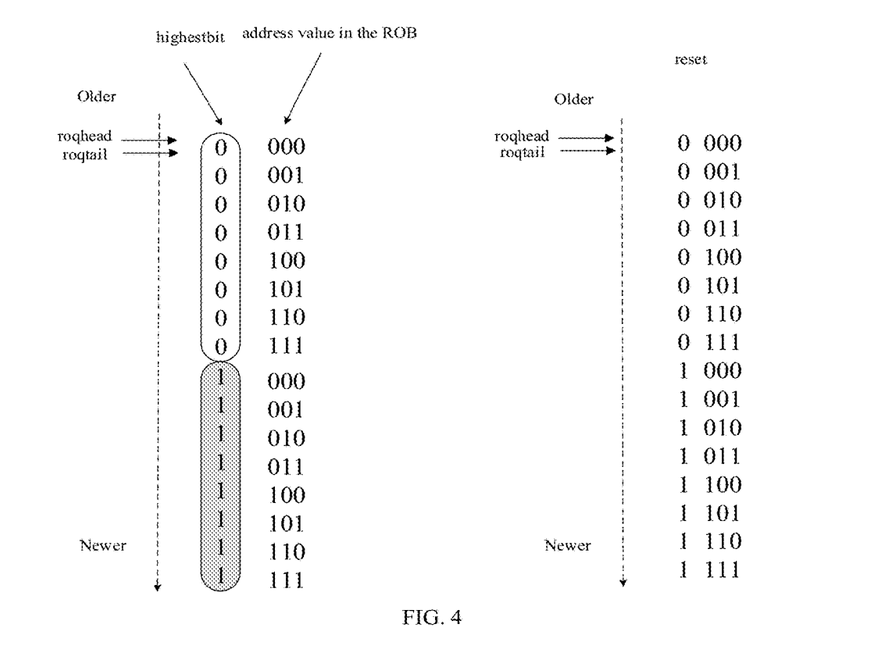
FIG. 4 is a schematic diagram illustrating a ROB in a reset state according to an embodiment of the disclosure.

For example, as illustrated in FIG. 4, both the roqhead and roqtail of the ROB point to the address 0 in the reset state (i.e., the initial state). When a new instruction is written into the ROB, the roqtail may increase, and after the instruction is exited, the roqhead may increase.

Further, in an embodiment of the disclosure, when both the roqhead and roqtail does not flip after the instructions are written in and exited from the ROB or B-ROB, the method includes: there are valid instructions between the roqhead and a previous item of the roqtail; when the roqtail does not flip, determining the added highest bits for the addresses allocated by the roqtail as the value A; and when the roqhead does not flip, determining the added highest bits for the addresses allocated by the roqhead as the value A.

Figure 5:
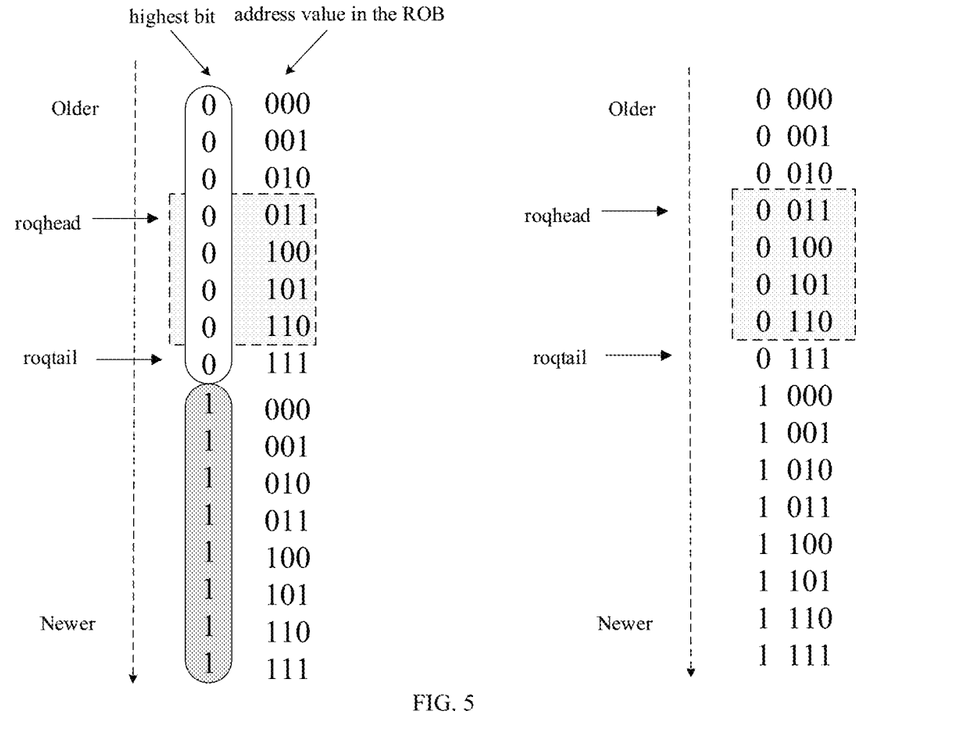
FIG. 5 is a schematic diagram illustrating a ROB when both the roqhead and the roqtail do not flip according to an embodiment of the disclosure.

Taking ROB as an example, FIG. 5 shows a situation where both the roqhead and roqtail do not flip after instructions are written in and exited from the ROB. As shown in the dashed box in FIG. 5, the instructions between the roqhead and the previous item of the roqtail are valid. The roqtail does not flip, and the highest bits of the instruction addresses allocated by the roqtail is 0. The roqhead does not flip, and the highest bit for the roqhead is 0. Therefore, after the XOR is performed on the added highest bit for the roqhead and the added highest bit for the ROB address, the address remains unchanged. That is, the instruction with the small address value may be old after the highest bit is added.

Further, in an embodiment of the disclosure, when the roqtail flips and the roqhead does not flip after instructions are written in and exited from the ROB or B-ROB, the method includes: determining the highest bit for the address of writing an instruction as the value B, and the added highest bit for the roqhead as the value A.

Figure 6:
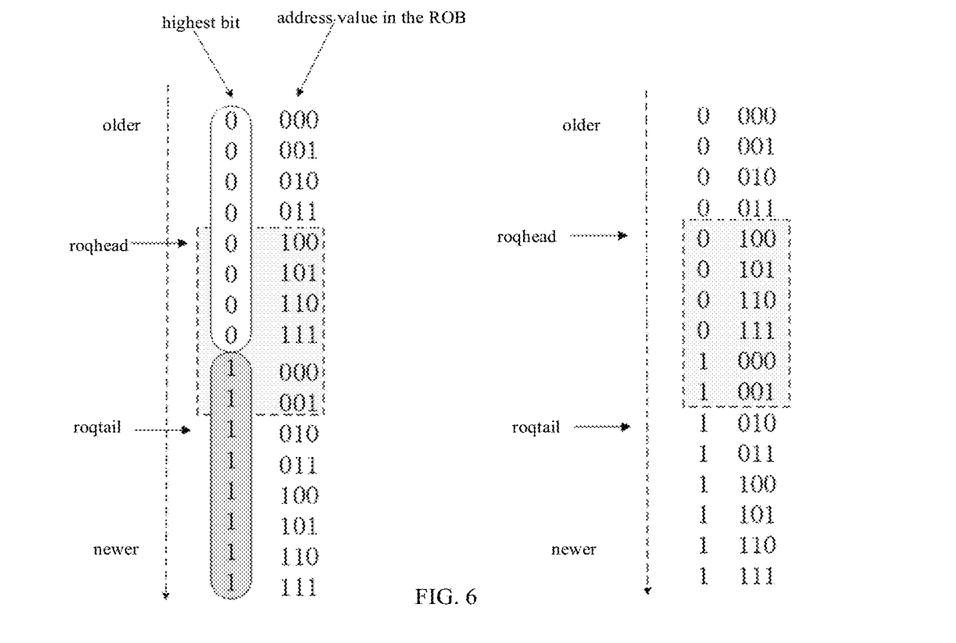
FIG. 6 is a schematic diagram illustrating a ROB when the roqtail flips but the roqhead does not flip according to an embodiment of the disclosure.

Taking ROB as an example, FIG. 6 shows a situation where the roqtail flips but the roqhead does not flip after instructions are written in and exited from the ROB. After the roqtail flips, the highest bit for the address of writing the instruction is 1. Since the roqhead has not yet flipped, the highest bit for the roqhead is 0. Therefore, the address remains unchanged after performing the XOR on the highest bit for the roqhead and the added highest bit for the address of the ROB. As shown in the dashed box in FIG. 6, the instructions between the roqhead and the roqtail are valid, and the instruction with the small address value may be old after adding the highest bit.

In an embodiment of the disclosure, when both the roqhead and roqtail flip after instructions are written in and exited from the ROB or B-ROB, the method includes: determining the highest bit for the address of writing the instruction as the value B, and the added highest bit for the roqhead is the value B.

Figure 7:
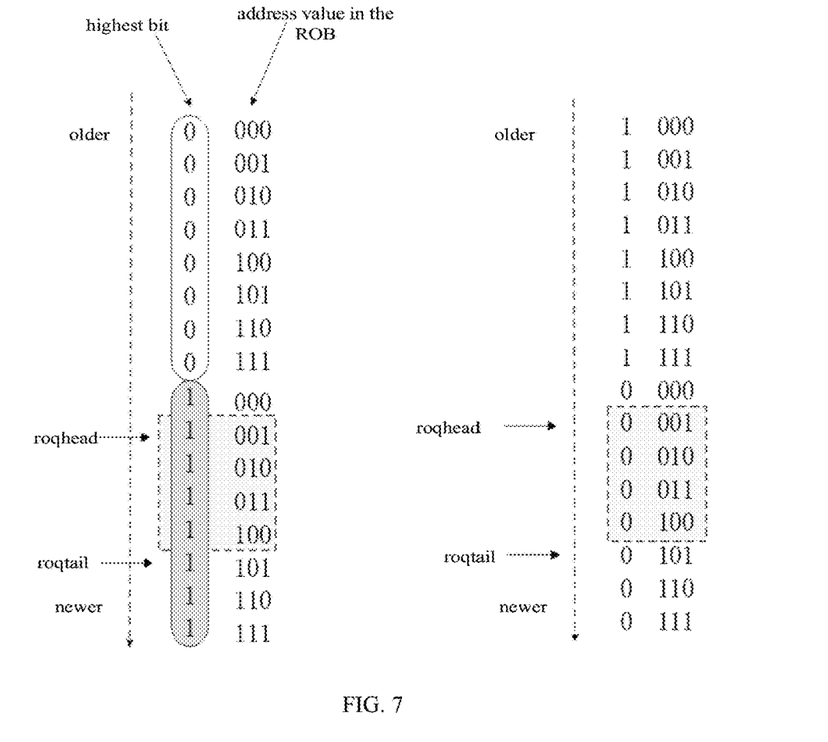
FIG. 7 is a schematic diagram illustrating a ROB when both the roqhead and the roqtail flip according to an embodiment of the disclosure.

Taking ROB as an example, FIG. 7 shows a situation where the roqtail flips and the roqhead also flips after instructions are written in and exited from the ROB. After the roqtail flips, the highest bit for the address of writing the instruction is 1. After the roqhead flips, the highest bit for the roqhead is 1. Therefore, the highest bits of the current addresses are opposite to the highest bits of the original addresses after performing the XOR on the highest bit for the roqhead and the added highest bit for the address of the ROB. As shown in the dashed box in FIG. 7, the instructions between the roqhead and the roqtail are valid. After performing the XOR on the added highest bit for the address of the ROB and the highest bit for the roqhead, the instruction with small address value may be old.

Further, in an embodiment of the disclosure, when the roqtail flips again and the roqhead does not flip again after instructions are written in and exited from the ROB or B-ROB, the method includes: determining the added highest bit for the address of writing the instruction as the value A, and the highest bit for the roqhead as the value B.

Figure 8:
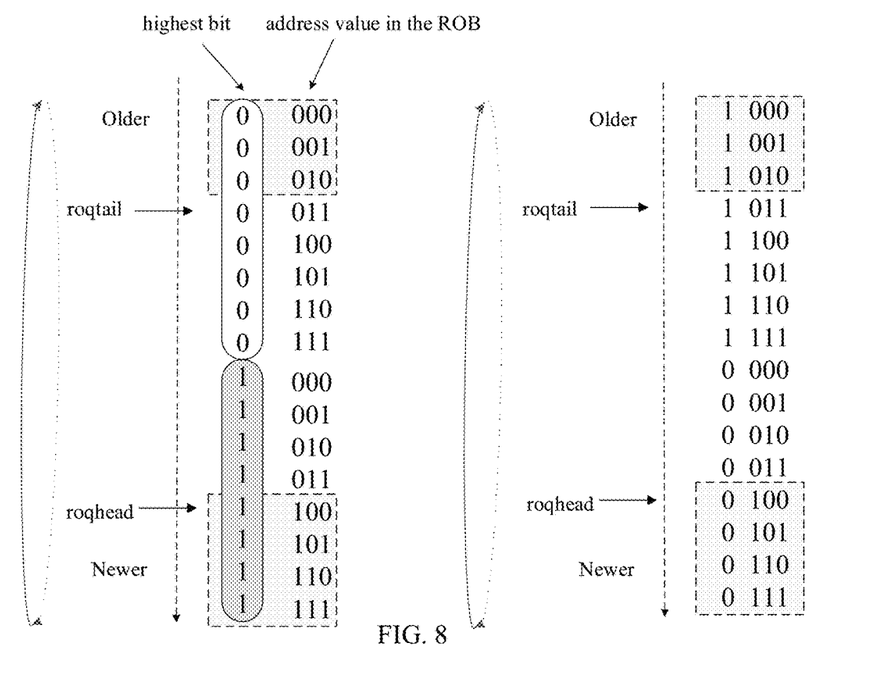
FIG. 8 is a schematic diagram illustrating a ROB when the roqhead flips again but the roqtail does not flip again according to an embodiment of the disclosure.

Taking ROB as an example, FIG. 8 shows a situation where the roqtail flips again but the roqhead does not flip again after instructions are written in and exited from the ROB. After the roqtail flips again, the highest bit for the address of writing the instruction is 0. Since the roqhead does not flip again, the highest bit for the roqhead is 1. Therefore, after performing the XOR on the added highest bit for the roqhead and the added highest bit for the address of the ROB, the highest bits for the current addresses is opposite to the highest bits of the original addresses. As shown in the dashed box in FIG. 8, the instructions between the roqhead and the roqtail are valid. After performing the XOR on the added highest bit for the address and the highest bit for the roqhead, the instruction with a small address value is old.

Further, in an embodiment of the disclosure, when both the roqhead and roqtail flip again after instructions are written in and exited from the ROB or B-ROB, the method includes: restoring both the added highest bit for the roqhead and the added highest bit for the roqtail to the value A.

Taking ROB as an example, after instructions are written in and exited from the ROB, the roqtail flips again, and the roqhead also flips again. The added highest bit for the roqhead and the added highest bit for the roqtail are restored to 0, just as shown in FIG. 5 where both the roqhead and the roqtail do not flip.

In an embodiment, when a maximum number of items in the queue of the ROB or B-ROB is not equal to a power of 2, and the roqhead or the roqtail points to the next item in a direction in which a value of the ROB address without the added highest bit increases.

In a possible implementation, when the roqhead or roqtail reaches the Nth item in the queue, low bits of the next item pointed by the roqhead or roqtail are coded from a first item in the queue. When the roqhead or roqtail reaches the item with the first preset number in the queue at low bits, a value of the highest bit for the roqhead or roqtail is flipped. N is an integer determined by a maximum number of items, for example, N can be equal to (the maximum number of items)−1.

In another possible implementation, when the roqhead or the roqtail reaches the Nth item, coding low bits of the next item pointed by the roqhead or roqtail is continued from the Nth item to an item with the power of 2, and recoding low bits of the next item pointed by the roqhead or roqtail is performed from the first item in the queue. When the roqhead or roqtail reaches the Mth item, a value of the added highest bit for the roqhead or roqtail is flipped, in which M is a value of determined by the power of 2. For example, M may be equal to (power of 2)−1.

In an embodiment, when a maximum number of items in the queue of the ROB or B-ROB is not equal to the power of 2, and the roqhead and roqtail point to the next item in a direction in which a value of the ROB address without the added highest bit decreases.

In a possible implementation, when the roqhead or roqtail reaches a first item in the queue, coding low bits of the next item pointed by the roqhead or roqtail starts from the Nth item in the queue. When the roqhead or roqtail reaches the first item in the queue, a value of the highest bit for the roqhead or roqtail is flipped.

In another possible implementation, when the roqhead or roqtail reaches a first item in the queue, recoding low bits of the next item pointed by the roqhead or roqtail is performed from the Mth item that is closest to and larger than the maximum number of items in the queue. When the roqhead or roqtail reaches the first item in the queue, a value of the highest bit for the roqhead or roqtail is flipped.

For example, for a case where the number of queue items is not equal to a power of 2, there are two processing methods for allocating the writing items by the roqtail of the ROB.

Method 1

For the case where the number of queue items is not a power of 2, when the roqtail reaches the maximum number of item in the queue, coding the newly entered instructions starts from 0 (that is, the roqtail flips). Similarly, when the roqhead reaches the maximum number of item in the queue, the roqhead also flips. After flipping, the highest bit is flipped from 0 to 1, or from 1 to 0. For example, the queue has 6 items, both the roqhead and roqtail flip after counting from the item number 0 to the item number 5. The processing procedures are as follows.

Figure 9:
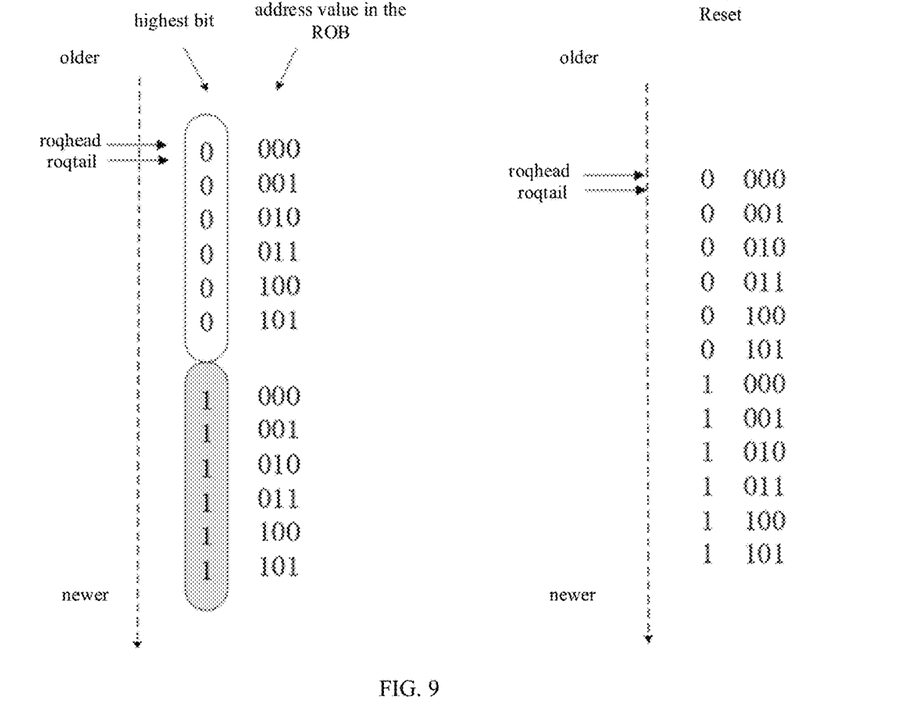
FIG. 9 is a schematic diagram illustrating a ROB in the reset state according to an embodiment of the disclosure.

(1) As illustrated in FIG. 9, both the roqhead and roqtail of the ROB point to the address 0 in the reset state, which is the initial state.

Figure 10:
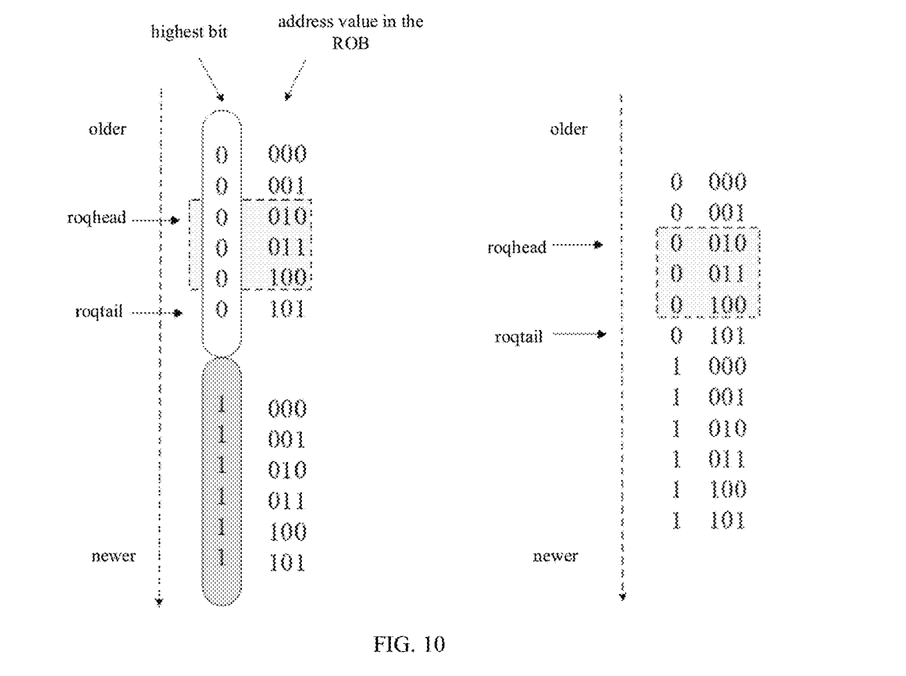
FIG. 10 is a schematic diagram illustrating a ROB when both the roqhead and the roqtail do not flip according to an embodiment of the disclosure.

(2) When a new instruction is written into the ROB, the roqtail may increase. When the instruction is exited from the ROB, the roqhead may increase. FIG. 10 shows that the roqhead and roqtail do not flip after instructions are written into and exited from the ROB. The instructions between the roqhead and the previous item for the roqtail are valid, as shown in the dash box of FIG. 10. The roqtail has not flipped, and the highest bits for the addresses of the instructions allocated by the roqtail is 0. The roqhead has not flipped, and the highest bit for the roqhead is 0. It can be seen that after performing the XOR on the highest bit for the roqhead and the added highest bit for the address, the address is unchanged. That is, the instruction with the small address value may be old after adding the highest bit.

Figure 11:
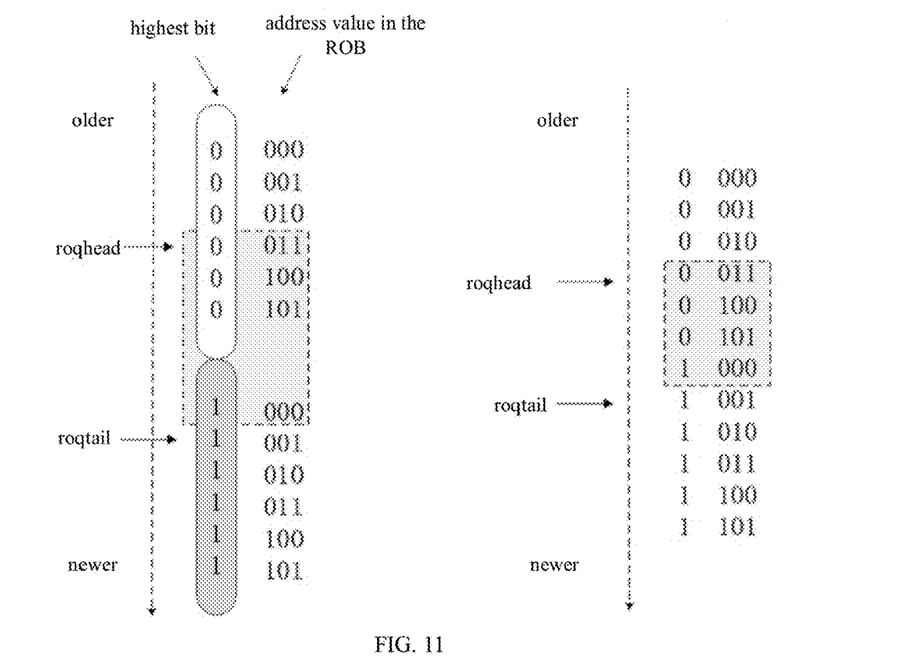
FIG. 11 is a schematic diagram illustrating a ROB when the roqtail flips but the roqhead does not flip according to an embodiment of the disclosure.

(3) FIG. 11 shows a situation where the roqtail flips but the roqhead does not flip after instructions are written in and exited from the ROB. After the roqtail flips, the highest bit for the address of writing the instruction is 1. Since the roqhead does not flip, the highest bit for the roqhead is 0. It can be seen that the address is unchanged after performing the XOR on the added highest bit for the address and the highest bit for the roqhead. The instructions between the roqhead and the previous item for the roqtail are valid, as shown in the dashed box in FIG. 11, the instruction with a small address value may be old after adding the highest bit.

Figure 12:
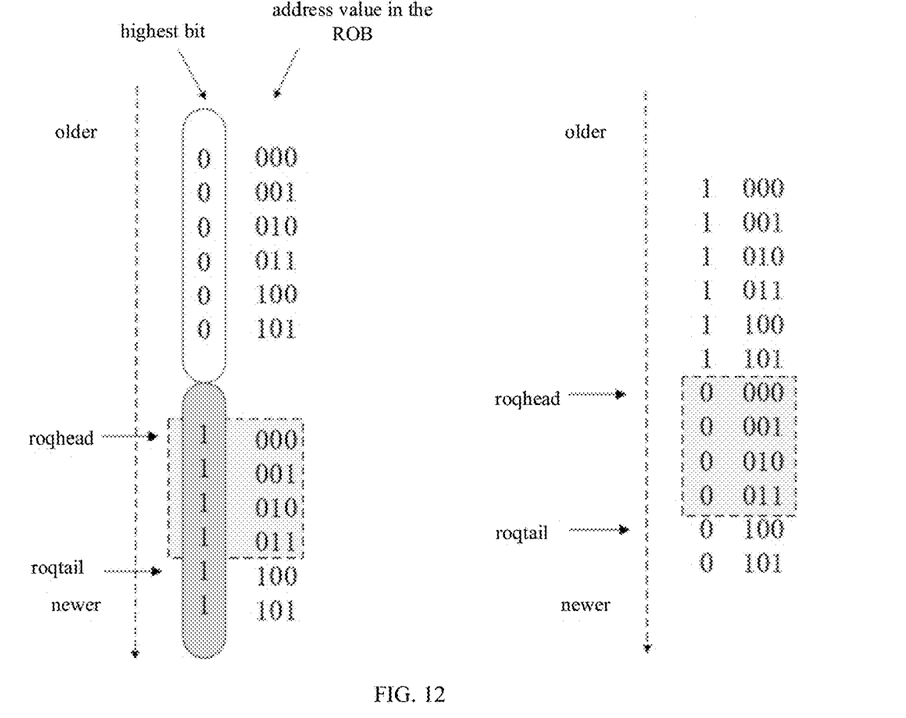
FIG. 12 is a schematic diagram illustrating a ROB when both the roqhead and the roqtail flip according to an embodiment of the disclosure.

(4) FIG. 12 shows a situation where the roqtail flips and the roqhead also flips after instructions are written in and exited from the ROB. After the roqtail flips, the highest bit for the address of writing the instruction is 1. After the roqhead also flips, the highest bit for the roqhead is 1. It can be seen that after performing the XOR on the added highest bit for the address and the highest bit for the roqhead, the highest bits of the current addresses are opposite to the highest bits of the original addresses. The instructions between the roqhead and the previous item for the roqtail are valid, as shown in the dashed box in FIG. 12, after performing the XOR on the added highest bit for the address and the highest bit for the roqhead, the instruction with a small address value may be old.

Figure 13:
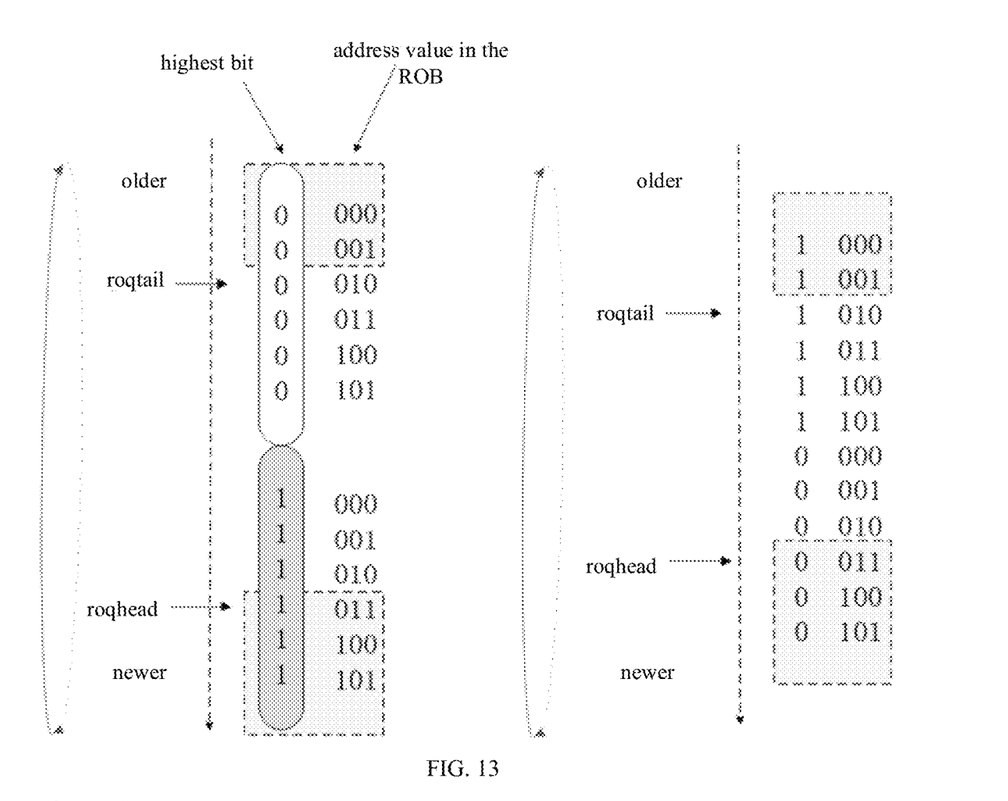
FIG. 13 is a schematic diagram illustrating a ROB when the roqtail flips again but the roqhead does not flip again according to an embodiment of the disclosure.

(5) FIG. 13 shows a situation where the roqtail flips again but the roqhead does not flip again after instructions are written in and exited from the ROB. After the roqtail flips again, the highest bit for the address of writing the instruction is 0. Since the roqhead does not flip again, the highest bit for the roqhead is 1. It can be seen that after performing the XOR on the added highest bit for the address and the highest bit for the roqhead, the highest bits of the current addresses are opposite to the highest bits of the original addresses. The instructions between the roqhead and the previous item for the roqtail are valid, as shown in the dotted box in FIG. 13, after performing the XOR on the added highest bit for the address and the highest bit for the roqhead, the instruction with a small address value may be old.

(6) The roqtail flips again and the roqhead also flips again after instructions are written in and exited from the ROB, the highest bits for both the roqhead and the roqtail restore to 0, which is the same as the situation where both the roqhead and the roqtail do not flip in FIG. 9.

Method 2

The case where the number of queue items is not a power of 2 is processed in a same way as the case where the number of queue items is closest to the power of 2. When the roqtail reaches the maximum number of item in the queue, coding the newly entered instruction continues to the item with the power of 2, then re-coding is performed (that is, the roqtail flips). The roqhead is processed in the same way as the roqtail. For example, the queue has 6 items, both the roqhead and roqtail flip after counting from the item number 0 to the item number 7, and then flip to 0 after counting the item number 8 to the item number 15. Therefore, the processing for the queue with 6 items is the same as the processing for the queue with 8 items.

After determining the age of the instruction, in some embodiments, in response to scheduling the out-of-order queue, the oldest valid instruction in the queue is selected for execution. In other embodiments, in response to determining the cancelled items in the queue, the instruction leading to cancellation in the queue and the instruction newer than the instruction leading to cancellation are selected for cancellation.

Further, the method for scheduling an out-of-order queue and determining cancelled items in the queue may be described below through some specific embodiments.

In the Embodiment 1 of the disclosure, in response to scheduling the instructions in an out-of-order queue, taking an 8-item out-of-order queue as an example, each item in the queue includes information field used by the instruction, such as a valid field, a rdy field, a roqid field, and a data field. The valid field records whether the item is valid (for example, 1 means valid, and 0 means invalid). The rdy field records whether this instruction and data are ready (for example, 1 means that ready in an executable state, 0 means not ready). The roqid field records the ROB address of the instruction for generating age information of the instruction. The data field records information such as commands and data used by the instruction for the item. The roqhead represents an address of a read pointer (head pointer) of the ROB.

When the out-of-order queue is executed, the oldest valid instruction that has been prepared in the item of the queue is selected for execution. The instruction age is determined by performing the XOR on the added highest bit of the roqid corresponding to each item and the highest bit for the roqhead, to obtain age information of the corresponding instruction, and the instruction age with a smallest age value is the oldest. The first item with the smallest age value is selected as the execution item of the out-of-order queue.

Figure 14:
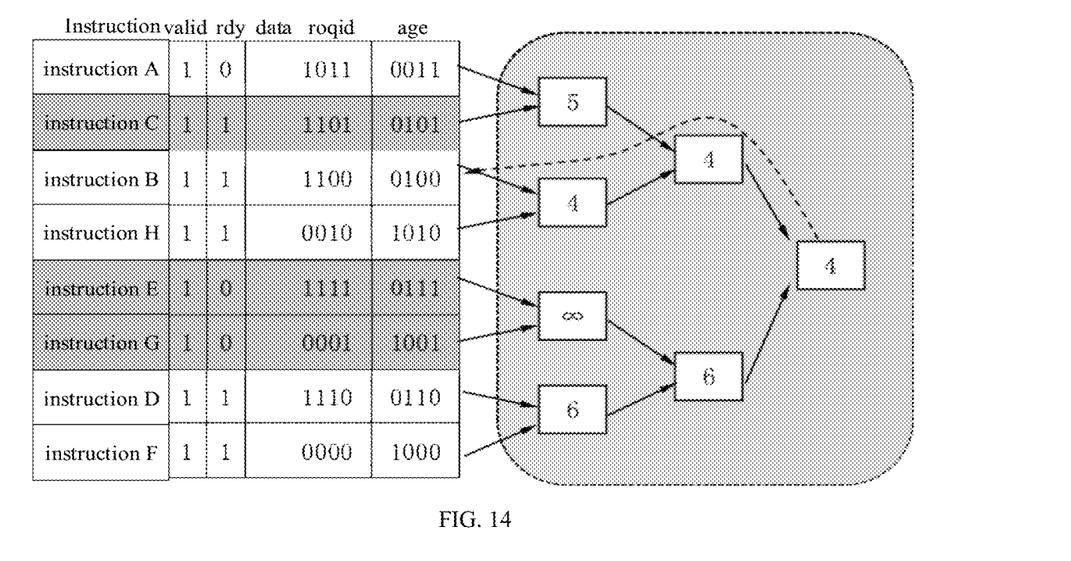
FIG. 14 is a schematic diagram illustrating an arbitration circuit configured to select instructions in an out-of-order queue to execute according to an embodiment of the disclosure.
Figure 15:
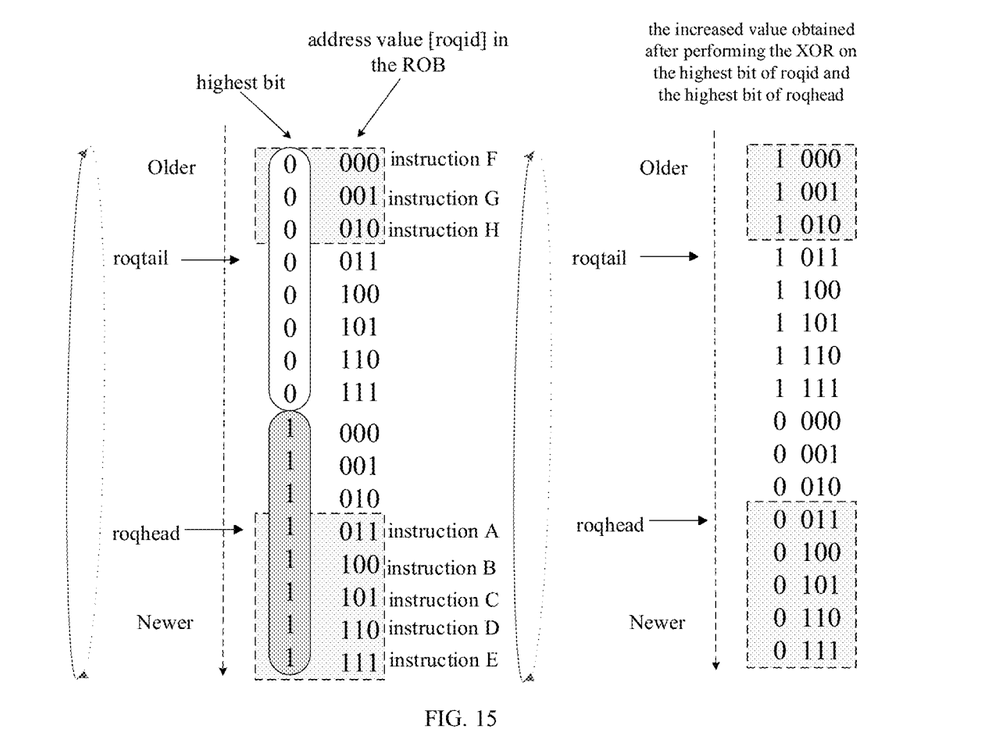
FIG. 15 is a schematic diagram illustrating generating an age value with a ROB address based on arbitration instructions of an out-of-order queue according to an embodiment of the disclosure.

As shown in FIG. 14, for an out-of-order queue with 8 items, the instructions A, B, C, D, E, F, and G in the queue are all valid, that is, the valid bits are all 1. The instruction whose rdy bit is 1 indicates that the instruction is ready. That is, the instructions B, C, D, F, and H are ready in an executable state. The roqid is a ROB address of the instruction. The state of the instruction in the ROB is shown in FIG. 15. The highest bit for the roqhead is 1, the XOR is performed on the highest bit for the roqhead and the highest bit of each roqid to obtain the age information of the instruction. The roqid in FIG. 14 is a value including the added highest bit value. By comparing the instruction age values, the arbitration obtains the instruction B that is valid, ready, and has the smallest age value 4 for execution.

In the Embodiment 2 of the disclosure, when a cancellation condition for the exceptions is met, the age information corresponding to the instruction in the pipeline is obtained to compare with the age information of the instruction for the exceptions. If the instruction age in the pipeline is new, then the instruction is cancelled.

Figure 16:
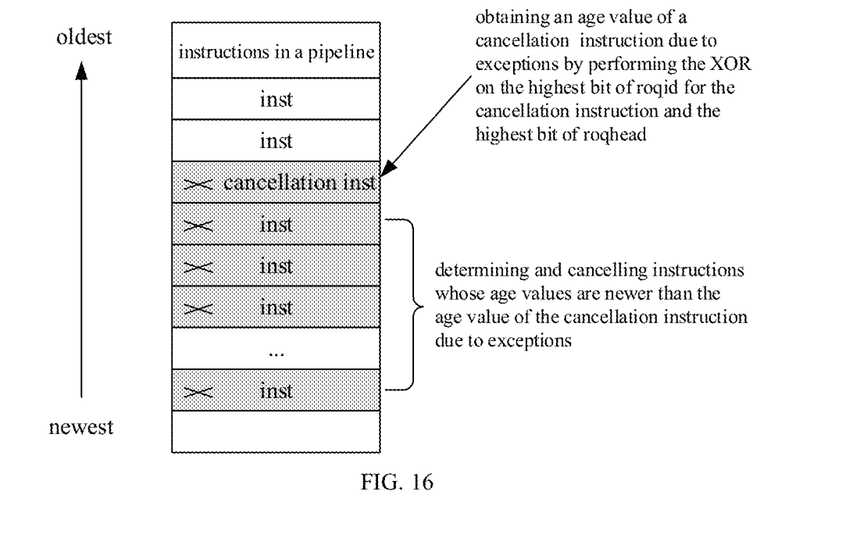
FIG. 16 is a schematic diagram of determining instructions to be cancelled due to exceptions according to an embodiment of the disclosure.

As shown in FIG. 16, in the case where the cancellation is caused by the exceptions, each instruction in the pipeline has a ROB address (that is, the roqid number for the instruction). An age value of an instruction in the pipeline, which is obtained by performing the XOR on the added highest bit of the roqid for this instruction in the pipeline and the highest bit for the roqhead (head pointer), is compared with an age value of an instruction for the exceptions, which is obtained by performing the XOR on the highest bit of the roqid for this instruction and the highest bit for the roqhead. The instruction in the pipeline is cancelled when its own age is newer than that of the instruction for the exceptions.

In the Embodiment 3 of the disclosure, when a cancellation condition for the branch mis-prediction is met, each instruction in the pipeline has a ROB/B-ROB address. The age information of an instruction in the pipeline, which is obtained by performing the XOR on the added highest bit for this instruction in the pipeline and the added highest bit for the roqhead of the ROB or B-ROB, is compared with the age information of a cancellation instruction due to the branch mis-prediction, which is obtained by performing the XOR on the added highest bit of this instruction and the added highest bit for the roqhead of the ROB or B-ROB. The instruction in the pipeline is cancelled when its own age information is newer than that of the cancellation instruction.

Figure 17:
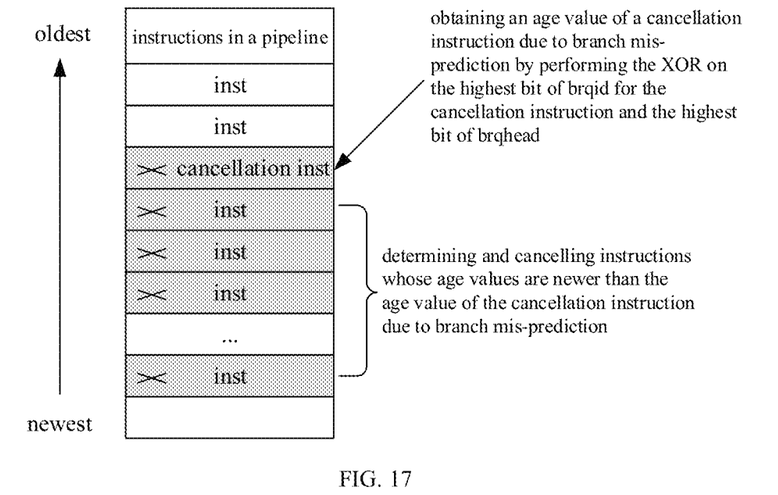
FIG. 17 is a schematic diagram of determining instructions to be cancelled due to branch mis-prediction due to according to an embodiment of the disclosure.

As shown in FIG. 17, in the case where the cancellation is caused by the branch mis-prediction, each instruction in the pipeline has the B-ROB address, that is, the brqid number for the instruction. The age value of the instruction in the pipeline, which is obtained by performing the XOR on the added highest bit for the brqid number of the instruction in the pipeline and the added highest bit for the read/head pointer (brqhead) of the B-ROB, is compared with the age value of the cancellation instruction due to the branch mis-prediction, which is obtained by performing the XOR on the added highest bit for the brqid number of the cancellation instruction and the added highest bit for the read/head pointer (brqhead) of the B-ROB. The instruction in the pipeline is cancelled when its own age is newer than that of the cancellation instruction due to the branch mis-prediction.

In the Embodiment 4 of the disclosure, when re-execution due to the memory access dependence occurs, both the load instruction and the instruction newer than the load instruction are rolled back, and all the rolled-back instructions are re-executed.

Figure 18:
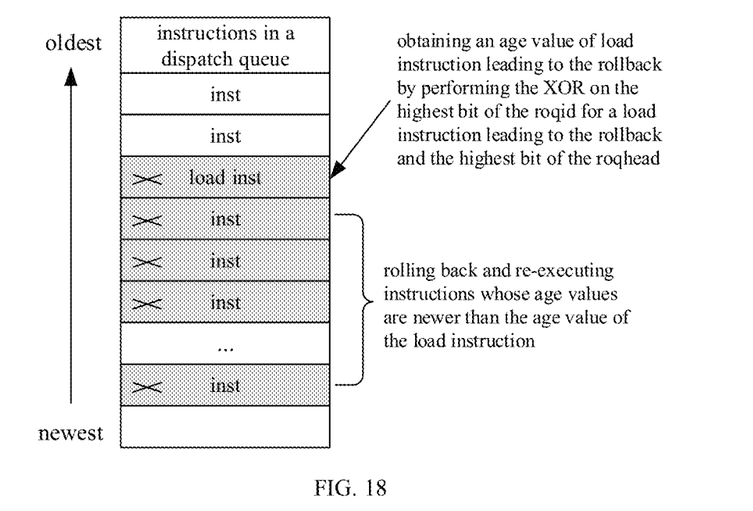
FIG. 18 is a schematic diagram of determining instructions to be cancelled due to rollback in items of a dispatch queue according to an embodiment of the disclosure.

In the rollback case, when the re-execution due to the memory access dependence occurs, i.e., it is found that a load instruction related to addresses between a store instruction and the next store instruction has been written back. Then this load instruction and the following instructions newer than the load instruction are rolled back. The rolled-back load instructions and all the following instructions are re-executed in the dispatch queue. The rolled-back instruction is also determined based on the age value obtained by performing the XOR on the added highest bit of the roqid number of an instruction and the highest bit of the read/head pointer (roqhead) of the ROB. It is determined which instructions are newer than the load instruction leading to the rollback and these instructions need to be re-executed. As shown in FIG. 18, in the fixed-point dispatch queue, the age information that is obtained by performing the XOR on the added highest bit for the roqid number and the added highest bit for the roqhead is determined as age information for comparison. As such, the cancelled item is calculated based on the age information. It can be seen that, cancellation and re-execution in the fixed-point dispatch queue needs to be performed from the $3^{rd}$ item.

According to the method for scheduling an out-of-order queue and determining cancelled items in the queue of the disclosure, the age information of the instruction is obtained by performing the XOR operation on the added highest bit pointed by the roqhead of the ROB or B-ROB and the added highest bit for the buffer address. The age information of the instructions is compared to obtain the new and old of instruction age, in order to effectively express the true age information of the instruction. During the determination, the use of the exclusive OR gate reduces the number of the used comparators, thereby effectively reducing the complexity and the delay of determining the age of the instruction, so that the performance of out-of-order processor is effectively improved, the power consumption is reduced, and area is saved. Furthermore, it may be improved that the determining efficiency of scheduling and cancelling in the out-of-order queue. In this way, the problem that there is a mess in the sequence of instruction ages caused by the flipping roqtail when determining the age based on the address of the ROB or B-ROB is solved.

Next, the apparatus for scheduling an out-of-order queue and determining cancelled items in the queue according to the embodiments of the disclosure will be described with reference to the accompanying drawings.

Figure 19:
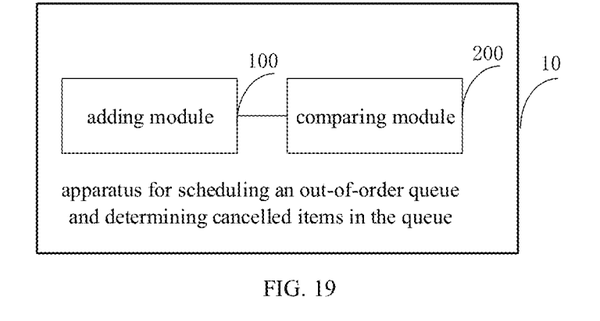
FIG. 19 is a block diagram of an apparatus for scheduling an out-of-order queue and determining cancelled items in the queue according to an embodiment of the disclosure.

FIG. 19 is a block diagram of an apparatus for scheduling an out-of-order queue and determining cancelled items in the queue according to an embodiment of the disclosure.

As illustrated in FIG. 19, the apparatus 10 includes: an adding module 100 and a comparing module 200.

The adding module 100 is configured to add a highest bit before each address of a reorder buffer (ROB) or a branch reorder buffer (B-ROB). The comparing module 200 is configured to perform an exclusive-OR (XOR) operation on the added highest bit for a read pointer (roqhead) of the ROB or B-ROB and the added highest bit for each of two addresses to be compared of the ROB or B-ROB, determine addresses after the XOR operation as age information of the two instructions, so as to obtain the sequence of instruction age values by comparing the age information.

In some embodiments, the apparatus 10 further includes: a scheduling module and a cancelling module.

The scheduling module is configured to select the oldest valid instruction for execution in response to scheduling the out-of-order queue.

The cancelling module is configured to select instructions leading to cancellation and instructions newer than the instructions leading to cancellation in the queue for cancellation in response to determining the cancelled items in the queue.

It should be noted that the foregoing explanations on the embodiments of the method for scheduling an out-of-order queue and determining cancelled items in the queue are also applicable to the apparatus for scheduling an out-of-order queue and determining cancelled items in the queue in this embodiment, which will not be repeated here.

With the apparatus for scheduling an out-of-order queue and determining cancelled items in the queue of the disclosure, the age information of the instruction is obtained by performing the XOR operation on the added highest bit pointed by the roqhead of the ROB or B-ROB and the added highest bit for the buffer address. The age information of the instructions is compared to obtain the new and old of instruction age, in order to effectively express the true age information of the instruction. During the determination, the use of the exclusive OR gate reduces the number of the used comparators, thereby effectively reducing the complexity and the delay of determining the age of the instruction, so that the performance of out-of-order processor is effectively improved, the power consumption is reduced, and area is saved. Furthermore, it may be improved that the determining efficiency of scheduling and cancelling in the out-of-order queue. In this way, the problem that there is a mess in the sequence of instruction age values caused by the flipping roqtail when determining the age based on the address of the ROB or B-ROB is solved.

The embodiments of the disclosure further provide an electronic device. The electronic device includes at least one processor and a memory communicatively connected with the at least one processor. The memory stores instructions that can be executed by the at least one processor, and the instructions are configured to implement the method for scheduling an out-of-order queue and determining cancelled items in the queue according to the above embodiments.

The embodiments of the disclosure also provide a computer-readable storage medium on which a computer program is stored. When the program is executed by the processor, the method as described above is implemented for scheduling an out-of-order queue and determining cancelled items in the queue.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or N embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the disclosure, "N" means at least two, for example, two or three, unless specified otherwise.

Any process or method described in a flowchart or described herein in other ways may be understood to include one or N modules, segments or portions of codes of executable instructions for achieving specific logical functions or steps in the process, and the scope of a preferred embodiment of the disclosure includes other implementations, the implementations may not be in the order shown or discussed, including in a substantially simultaneous manner or in the flipped order according to the functions involved, to perform the functions, which should be understood by those skilled in the art.

The logic and/or step described in other manners herein or shown in the flowchart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or N wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, N steps or methods may be realized by the software or firmware stored in the memory and executed by the appropriate instruction execution system. For example, if it is realized by the hardware, likewise in another embodiment, the steps or methods may be realized by one or a combination of the following techniques known in the art: discrete logic circuits having logic gate circuits for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A method for scheduling an out-of-order queue, comprising:
   adding a highest bit before each address in a reorder buffer (ROB) or in a branch reorder buffer (B-ROB), in which the addresses are entered by instructions in the out-of-order queue;
   adding a highest bit for a read pointer (roqhead) of the ROB or B-ROB;
   performing an exclusive-OR (XOR) operation on the highest bit for the roqhead and the highest bit for each of the addresses entered by two instructions to be compared;
   determining addresses after the XOR operation as age information of the two instructions to be compared; and
   comparing the age information to determine an oldest instruction in the queue for execution in response to scheduling the out-of-order queue.

2. The method of claim 1, further comprising:
   selecting instructions leading to cancellation and instructions newer than the instructions leading to cancellation in the queue for cancellation in response to determining the cancelled items in the queue.

3. The method of claim 2, wherein reading the ROB or B-ROB is controlled by the roqhead;
   when the queue is not empty, the roqhead points to a first item to be read next time, wherein the ROB or B-ROB is an ordered first-in first-out queue, the first item pointed by the roqhead is an oldest item in the ROB or B-ROB, and the oldest item corresponds to the oldest instruction; and
   when the queue is empty, both the roqhead and a write pointer (roqtail) point to the same empty item and a value of the highest bit for the roqhead is the same as a value of the highest bit for the roqtail.

4. The method of claim 2, wherein writing the ROB or B-ROB is controlled by a write pointer (roqtail) and a position of each instruction in the ROB or B-ROB is allocated by the roqtail;
   when the queue is not full, the roqtail points to a first empty item to be written next time; and
   when the queue is full, both the roqhead and roqtail point to the same item and a value of the highest bit for the roqhead is opposite to a value of the highest bit for the roqtail.

5. The method of claim 2, wherein both the roqhead and a write pointer (roqtail) of the ROB or B-ROB point to a reset item in a reset state, when a new instruction is written in the ROB or B-ROB, the roqtail points to the next item to be written, and when the instruction is exited, the roqhead points to the next item to be read.

6. The method of claim 5, wherein the reset item refers to the same item pointed by both the roqhead and roqtail during the reset, the reset item is any item in the queue, and the highest bit for the roqhead is the same as the highest bit for the roqtail during the reset.

7. The method of claim 6, wherein when a maximum number of items in the queue of the ROB or B-ROB is not equal to a power of 2, and the roqhead or the roqtail points to the next item in a direction in which a value of the ROB address without the added highest bit increases, the method comprises:
   when the roqhead or roqtail reaches an Nth item in the queue, wherein N is an integer determined by the maximum number of items,
   coding low bits of the next item pointed by the roqhead or roqtail from a first item in the queue; and
   flipping a value of the highest bit for the roqhead or roqtail.

8. The method of claim 6, wherein when a maximum number of queue items in the ROB or B-ROB is not equal to a power of 2, and the roqhead or the roqtail point to the next item in a direction in which a value of the ROB address without the added highest bit increases, the method comprises:
   when the roqhead or roqtail reaches an Nth item, continuing to code low bits of the next item pointed by the roqhead or roqtail from the Nth item to an item with the power of 2, and recoding low bits of the next item pointed by the roqhead or roqtail from the first item in the queue; and
   when the roqhead or roqtail reaches an Mth item, flipping a value of the highest bit for the roqhead or roqtail, wherein M is a value of determined by the power of 2.

9. The method of claim 6, wherein when a maximum number of items in the queue of the ROB or B-ROB is not equal to a power of 2, and the roqhead and roqtail point to the next item in a direction in which a value of the ROB address without the added highest bit decreases, the method further comprises:
   when the roqhead or roqtail reaches a first item in the queue, coding low bits of the next item pointed by the roqhead or roqtail from an Nth item in the queue, wherein N is an integer determined by the maximum number of items; and
   flipping a value of the highest bit for the roqhead or the roqtail.

10. The method of claim 6, wherein when a maximum number of items in the queue of the ROB or B-ROB is not equal to a power of 2, and the roqhead and roqtail point to the next item in a direction in which a value of the ROB address without the added highest bit decreases, the method further comprises:
    when the roqhead or roqtail reaches a first item in the queue, recording low bits of the next item pointed by the roqhead or roqtail from an Mth item, wherein M is an integer closest to and larger than the number of items in the queue; and
    flipping a value of the highest bit for the roqhead or roqtail.

11. The method of claim 1, wherein the highest bit added before each address in the ROB or B-ROB is a value A or a value B which is a 1-bit binary value, and the value A is opposite to the value B.

12. The method of claim 11, wherein when the roqhead and a write pointer (roqtail) do not flip after instructions are written in and exited from the ROB or B-ROB, the method comprises:
    in response to the roqtail not flipping, determining the highest bits for the addresses allocated by the roqtail to be the value A; and in response to the roqhead not flipping, determining the highest bits for the addresses allocated by the roqhead to be the value A.

13. The method of claim 11, wherein when a write pointer (roqtail) flips and the roqhead does not flip after instructions are written in and exited from the ROB or B-ROB, the method comprises:
determining the highest bit for the roqtail to be the value B, and the highest bit for the roqhead to be the value A.

14. The method of claim 11, wherein when both the roqhead and a write pointer (roqtail) flip after instructions are written in and exited from the ROB or B-ROB, the method comprises:
determining the highest bit for the roqtail to be the value B, and the highest bit for the roqhead to be the value B.

15. The method of claim 11, wherein when a write pointer (roqtail) flips again and the roqhead does not flip again after instructions are written in and exited from the ROB or B-ROB, the method comprises:
determining the highest bit for the roqtail to be the value A, and the highest bit for the roqhead to be the value B.

16. The method of claim 11, wherein when both the roqhead and a write pointer (roqtail) flip again after instructions are written in and exited from the ROB or B-ROB, the method comprises:
restoring both the highest bit for the roqhead and the highest bit for the roqtail to be the value A.

17. The method of claim 1, further comprising:
in response to meeting a cancellation condition due to exceptions, obtaining age information of each instruction in a pipeline;
comparing the age information of each instruction with age information of a cancelled instruction due to the exceptions; and
performing cancellation in response to the instruction in the pipeline being newer than the cancelled instruction due to the exceptions.

18. The method of claim 1, further comprising:
in response to meeting a cancellation condition due to branch mis-prediction, comparing the age information obtained after performing the XOR operation on the highest bit of the instruction in a pipeline and the highest bit for the roqhead of the ROB or B-ROB, with the age information obtained after performing the XOR operation on the highest bit of the cancelled instruction due to the branch mis-prediction and the highest bit for the roqhead of the ROB or B-ROB, wherein each instruction in the pipeline has a ROB or B-ROB address; and
performing cancellation in response to the instruction in the pipeline being newer than the cancelled instruction due to the branch mis-prediction.

19. The method of claim 1, further comprising:
in response to re-execution caused by speculative memory accesses fail, rolling back both load instructions and instructions newer than the load instructions, and re-executing the rolled back instructions.

20. An electronic device, comprising: an out-of-order processor, and a reorder buffer (ROB) or a branch reorder buffer (B-ROB) configured to store addresses entered by instructions in an out-of-order queue;
wherein the out-of-order processor is configured to:
add a highest bit before each address and add a highest bit for a read pointer (roqhead) of the ROB or B-ROB;
perform an exclusive-OR (XOR) operation on the highest bit for the roqhead and the highest bit for each of the addresses entered by the instructions to be compared;
determine an oldest instruction in the out-of-order queue by comparing the addresses after the XOR operation; and
execute the oldest instruction in response to scheduling the out-of-order queue.

* * * * *